No. 827,601. PATENTED JULY 31, 1906.
W. BASJANOFF.
LOCK HORSESHOE.
APPLICATION FILED SEPT. 26, 1905.

Witnesses
Geo. A. Byrne.
Stephen Finsto

Inventor
W. Basjanoff
By Wilkinson & Fisher
his Attorneys

UNITED STATES PATENT OFFICE.

WLADIMIR BASJANOFF, OF MOSCOW, RUSSIA.

LOCK-HORSESHOE.

No. 827,601. Specification of Letters Patent. Patented July 31, 1906.

Application filed September 26, 1905. Serial No. 280,193.

*To all whom it may concern:*

Be it known that I, WLADIMIR BASJANOFF, a subject of the Emperor of Russia, and a resident of Moscow, Russia, (Novinsky boulevard, Deviatinsky street, house Freshkop,) have invented certain new and useful Improvements in Lock-Horseshoes, of which the following is a specification.

My invention has for its object an improved horseshoe called "lock-horseshoe," which obviates the necessity of frequently renewing the shoeing of horses, and consequently preserves the hoof from being damaged by the shoe-nails, which latter enter sometimes into the flesh part of the hoof, causing cruel pain to the animal and producing hoofaches. By this reason the lock-horseshoe is a hygienic one. Besides, this horseshoe greatly simplifies the renewal of shoes.

The essential peculiarity of my horseshoe resides in the fact that it is combined of two parts, the one part being a fixed or permanent one and the other being removable. The fixed part or "the box" is solidly attached to the hoof, and the removable part is simply laid in in the fixed part, where it rests upon an elastic layer and is retained on its place by a special lock, as will be presently described.

Figure 1:
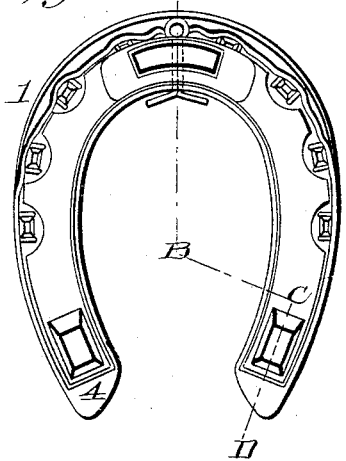
Figure 2:
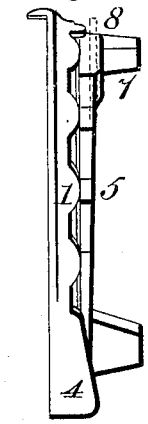
Figure 3:
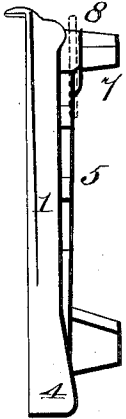
Figure 4:
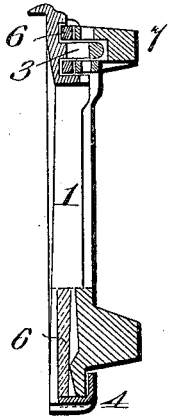
Figure 5:
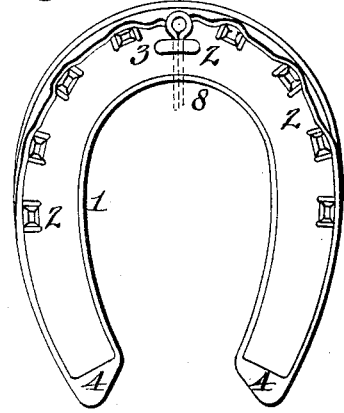
Figure 6:
Figures 7, 8:
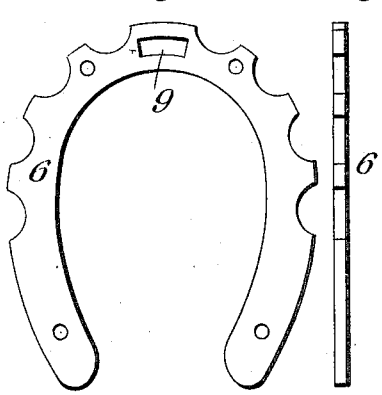
Figure 9:
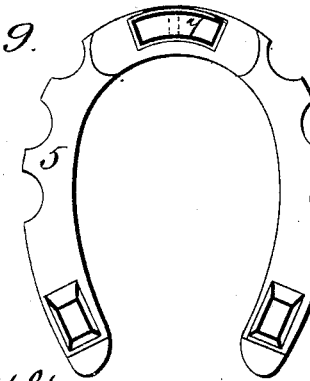
Figure 10:
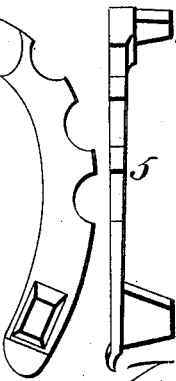

On the accompanying drawings, Figure 1 represents, at about a half natural size, the under side of my lock-horseshoe completely mounted or put together. Fig. 2 is a side view of same; Fig. 3, also a side view of this horseshoe, the form of the box being slightly modified. Fig. 4 represents a section through the line A B C D on Fig. 1. Fig. 5 represents the under side of the fixed (permanent) part of the shoe; Fig. 6, a side view of same. Figs. 7 and 8 are front and side views of the elastic layer. Figs. 9 and 10 are front and side views of the removable part of the shoe.

My lock-horseshoe consists of a shoe-formed box 1, which is attached to the hoof like an ordinary horseshoe by means of shoe-nails, and it is provided for this purpose with openings 2, Fig. 5. The upright external side or flange of this box can be made of almost uniformal height, Fig. 3, or it may be cut and have wave-like appearance, Fig. 2, in order to reduce the weight of the shoe. In its front part the box 1 has on its under side an upright projection 3, Fig. 5, provided with an opening, Fig. 4, for the lock-pin 8, Figs. 2, 3, and 5. The two ends of the box 1 are made in the form of pockets 4, Figs. 4 and 5, for lodging the ends of the layer 6 and of the removable part 5. This removable part 5 has also a form of an ordinary shoe and is provided with tenons, which may be soldered or fixed by the aid of screw-pins, as usually. The front tenon 7 has an inner recess or cavity, Fig. 4, into which enters the upright projection 3 of the box. Besides, the tenon 7 has transverse openings arranged in conformity with the opening of the projection 3, and through these three openings is passed the locking-pin or splint (key) 8, as indicated by dotted lines on Figs. 2 and 3. By means of this simple contrivance the removable part 5 is solidly and securely fixed in the box 1, owing to the elastic layer 6, which presses the ends of the removable part 5 to the pockets 4, Fig. 4. The other advantage of this arrangement is that the part 5 is easily removable, since it is sufficient only to remove the pin or splint 8.

It is obvious that the arrangement of the upright projection 3 and of the recess may be reversed—*i. e.*, the projection 3 can be made on the removable part 5 and the recess in a corresponding boss on the box 1. The elastic layer 6 has also the form of a horseshoe, Figs. 7 and 8, and can be made of any appropriate material, (india-rubber, leather, felt, metallic spring-blade, &c.) The layer 6 is provided in its front part with an opening 9 for the passage of the projection 3 of the box. The edges of the layer 6 have cuts for the passage of shoe-nails. The two ends of the layer 6 enter into the pockets 4. This layer is placed in the box 1 under the removable part 5, Fig. 4, and is designed not only to firmly retain this part in the box 1, but also to secure a soft and elastic support for the hoof, thus avoiding the occurring of "broken legs" for the horses. Thus the chief advantages of my lock-horseshoes consist, besides avoiding a frequent shoeing of horses and its deficiencies, (loosening of nails, hoofaches, broken legs, &c.,) in the simplicity and easiness of renewing the shoes, which are locked in their boxes by single locking-pins, (splints.)

I claim as my invention—

A lock-horseshoe comprising a permanent member, an elastic layer, a removable part provided with tenons, said permanent member being provided with a lug, and its ends provided with pockets, the removable part being provided at its forward portion with a recess adapted to receive the lug of the permanent member, and being further provided with transverse openings, a locking-pin adapted to enter the transverse openings, the ends of the removable part being lodged within the pockets of the permanent member in firm connection therewith, whereby an elastic mounting of the whole shoe is attained, substantially as described.

In testimony whereof I have signed my name to this specification in the presence of two subscribing witnesses.

WLADIMIR BASJANOFF.

Witnesses:
  N. D. FORNIN,
  N. TSCHENALOFF.